United States Patent
Nomura

(10) Patent No.: US 9,871,976 B2
(45) Date of Patent: Jan. 16, 2018

(54) IMAGING APPARATUS, CONTROL SYSTEM AND CONTROL METHOD

(71) Applicant: Kenichiroh Nomura, Kanagawa (JP)

(72) Inventor: Kenichiroh Nomura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/066,032

(22) Filed: Mar. 10, 2016

(65) Prior Publication Data
US 2016/0269607 A1    Sep. 15, 2016

(30) Foreign Application Priority Data

Mar. 10, 2015  (JP) ................................ 2015-047292

(51) Int. Cl.
*H04N 5/235* (2006.01)
*H04N 5/243* (2006.01)
(Continued)

(52) U.S. Cl.
CPC ......... *H04N 5/2353* (2013.01); *H04N 5/2258* (2013.01); *H04N 5/2351* (2013.01);
(Continued)

(58) Field of Classification Search
None
See application file for complete search history.

(56) References Cited

U.S. PATENT DOCUMENTS 5,053,871 A     10/1991   Ogawa et al.
5,903,303 A *   5/1999    Fukushima .......... H04N 5/2351
                                                       348/207.99
(Continued)

FOREIGN PATENT DOCUMENTS

JP     H02 288560      11/1990
JP     2000 039643      2/2000
(Continued)

OTHER PUBLICATIONS

Extended European Search Report dated Aug. 4. 2016 in Patent Apptication No. 16159457.7.
(Continued)

*Primary Examiner* — Timothy J Henn
(74) *Attorney, Agent, or Firm* — Oblon, McClelland, Maier & Neustadt, L.L.P.

(57) ABSTRACT

An imaging apparatus comprises a plurality of imaging elements, an exposure time and a sensitivity value, a memory that stores correction information used to correct the exposure time and the sensitivity value, a correction circuit that corrects, when the exposure time corresponds to the predetermined exposure time, the exposure time and the sensitivity value according to the correction information to generate a corrected exposure time and a corrected sensitivity value, a setting circuit that sets setting values to control each imaging element, a control circuit that controls, when the exposure time calculated by the calculation circuit does not correspond to the predetermined exposure time, simultaneous exposure of each imaging element by using the setting value, and an image generating circuit that generates separate images acquired by each of the imaging elements.

20 Claims, 10 Drawing Sheets

(51) Int. Cl.
*H04N 5/374* (2011.01)
*H04N 5/225* (2006.01)
*H04N 5/232* (2006.01)

(52) U.S. Cl.
CPC ......... *H04N 5/23238* (2013.01); *H04N 5/243* (2013.01); *H04N 5/374* (2013.01)

(56) References Cited

U.S. PATENT DOCUMENTS

| | | |
|---|---|---|
| 2003/0184661 A1 | 10/2003 | Yubata et al. |
| 2004/0184656 A1 | 9/2004 | Anei |
| 2005/0264682 A1 | 12/2005 | Kurane |
| 2007/0092244 A1* | 4/2007 | Pertsel ............... H04N 5/23248 396/153 |
| 2009/0309957 A1* | 12/2009 | Ge ...................... H04N 3/1587 348/36 |
| 2010/0208099 A1 | 8/2010 | Nomura |
| 2010/0231746 A1 | 9/2010 | Nomura |
| 2011/0050950 A1 | 3/2011 | Nomura |
| 2011/0199508 A1 | 8/2011 | Nomura |
| 2013/0242040 A1* | 9/2013 | Masuda ............... H04N 5/2251 348/36 |
| 2014/0078247 A1* | 3/2014 | Shohara ................ H04N 9/735 348/38 |
| 2014/0125839 A1 | 5/2014 | Shiohara |
| 2015/0022688 A1 | 1/2015 | Shiohara |
| 2015/0222816 A1 | 8/2015 | Shohara et al. |
| 2016/0094825 A1* | 3/2016 | Lu ......................... H04N 9/735 348/223.1 |
| 2016/0100112 A1 | 4/2016 | Shiohara |

FOREIGN PATENT DOCUMENTS

| | | |
|---|---|---|
| JP | 2003 283930 | 10/2003 |
| JP | 3778114 | 3/2006 |
| JP | 4152606 | 7/2008 |
| JP | 2009 260714 | 11/2009 |
| JP | 4985251 | 5/2012 |
| JP | 2014-123797 A | 7/2014 |
| WO | WO 2014/042104 A1 | 3/2014 |

OTHER PUBLICATIONS

Japanese Office Action dated Jul. 21, 2015, in corresponding Japanese Application No. 2015-047292 (with English translation) (4 pages).

* cited by examiner

VERTICAL 16 SEGMENTATION

HORIZONTAL 16 SEGMENTATION

| AE EVALUATION VALUE | $\Delta E_v$ |
|---|---|
| 3680 | +3 |
| 1840 | +2 |
| 920 | +1 |
| 460 | ±0 |
| 230 | −1 |
| 115 | −2 |
| 58 | −3 |

FIG. 10

| INPUT | OUTPUT | |
|---|---|---|
| $T_v$ | $T_v$ AFTER CORRECTION | $S_v$ CORRECTION VALUE |
| 0 × BF | 0 × C0 | +1 |
| 0 × BE | 0 × C0 | +2 |
| 0 × BD | 0 × C0 | +3 |
| 0 × B6 | 0 × B7 | +1 |
| 0 × B5 | 0 × B7 | +2 |

IMAGING APPARATUS, CONTROL SYSTEM AND CONTROL METHOD

The present application is based upon and claims the benefit of priority to Japanese Patent Application No. 2015-047292, filed in Japan on Mar. 10, 2015, the entire contents of which is incorporated by reference.

FIELD OF THE INVENTION

The present application relates to an imaging apparatus, control system and control method for the correction of setting values used to capture of images by imaging elements.

BACKGROUND

A camera, sometimes referred to as an imaging apparatus, includes one or more imaging elements such as a complementary metal oxide semiconductor (CMOS) imaging sensors, and converts light received by the one or more imaging elements into an image signal. The camera may also calculate an exposure value to correct an exposure based on a luminosity value, conduct an adjustment of a setting value of a shutter speed and a diaphragm value, etc., in accordance with a program chart of the exposure value.

Some cameras include an automatic exposure (AE) control function that automatically conducts an exposure adjustment.

A luminosity value is a value which represents a degree of luminous intensity of an image, the exposure is to expose the imaging elements to light, and the correct exposure is exposure as images that represent a natural luminous intensity and color when people see the images. The exposure value is a value representing a degree of exposure of the imaging elements to light. The shutter speed is a time (exposure time) in which the imaging elements are exposed to light by the opening of a shutter which opens and closes to interrupt light. The diaphragm value is the value of luminous intensity which is images appearing in the imaging elements and may be referred to as F-number. The program chart is a correspondence table including information that correlates exposure value, shutter speed and diaphragm value.

When the luminosity of an object becomes high, the AE control function conducts a control process in which the shutter speed is increased (made fast) and the diaphragm is decreased (made small). However, some cameras are not equipped with a diaphragm mechanism because such mechanisms increase cost, in such low-cost cameras, an exposure control is performed by only adjusting the shutter speed (Refer to Japanese Patent Application Laid-open no. H2-288560 and Pat. No. 3,778,114).

When capturing video, it is necessary to conduct a precise exposure control so as to smoothly transition between frames. Generally, as shutter speed increases, a speed of resolution of a CMOS imaging sensor decreases. However, conventional cameras cannot accurately perform such precise exposure control with a high shutter speed in an environment when luminosity of an object is high. Accordingly, such an imaging apparatus and control method to conduct precise exposure control are desired.

SUMMARY

An imaging apparatus in accordance in accordance with the present disclosure comprises a plurality of imaging elements that each form an image by capturing light passed through lenses, and a calculation circuit that calculates, for each imaging element, an exposure time and a sensitivity value, the sensitivity value being a sensitivity of the imaging element to the light, the exposure time being a time in which the imaging element is exposed to the light and the calculation circuit calculates the exposure time based on the image acquired by the imaging element and an exposure area of the imaging element in which the light has passed through the lenses.

The imaging apparatus further comprises a memory that stores correction information used to correct the exposure time and the sensitivity value, the correction information including a predetermined exposure time and a predetermined sensitivity value corresponding to the predetermined exposure time; and a correction circuit that corrects, when the exposure time corresponds to the predetermined exposure time, the exposure time and the sensitivity value according to the correction information to generate a corrected exposure time and a corrected sensitivity value.

The imaging apparatus further comprises a setting circuit that sets setting values to control each imaging element, the setting circuit setting the setting values as the exposure time and the sensitivity value or setting the setting values as the corrected exposure time and the corrected sensitivity value; a control circuit that controls, when the exposure time calculated by the calculation circuit does not correspond to the predetermined exposure time, simultaneous exposure of each imaging element by using the setting value; and an image generating circuit that generates the images acquired by each of the imaging elements.

A method for controlling an imaging apparatus, including a plurality of imaging elements that each form an image by capturing light passed through lenses, in accordance with the present disclosure comprises calculating, by a calculation circuit, for each imaging element, an exposure time and a sensitivity value, the sensitivity value being a sensitivity of the imaging element to the light, the exposure time being a time in which the imaging element is exposed to the light and the calculation circuit calculates the exposure time based on the image acquired by the imaging element and an exposure area of the imaging element in which the light has passed through the lenses.

The method further comprises storing correction information in a memory, the correction information used to correct the exposure time and the sensitivity value and the correction information including a predetermined exposure time and a predetermined sensitivity value corresponding to the predetermined exposure time, and correcting, by a correction circuit when the exposure time corresponds to the predetermined exposure time, the exposure time and the sensitivity value according to the correction information to generate a corrected exposure time and a corrected sensitivity value.

The method further comprises setting, by a setting circuit, setting values to control each imaging element as the exposure time and the sensitivity value or set the setting values as the corrected exposure time and the corrected sensitivity value, controlling, by a control circuit when the exposure time does not correspond to the predetermined exposure time, simultaneous exposure of each imaging element by using the setting value, and generating separate images acquired by each of the imaging elements.

BRIEF DESCRIPTION OF THE DRAWINGS

The accompanying drawings are included to provide further understanding of the invention, and are incorporated

FIG. 10 illustrates exemplary correction information referred to during the exemplary process illustrated in the flowchart of FIG. 9.

DETAILED DESCRIPTION OF THE PREFERRED EMBODIMENTS

Embodiments of the present disclosure are described below with reference to the accompanying drawings.

Figure 1A:
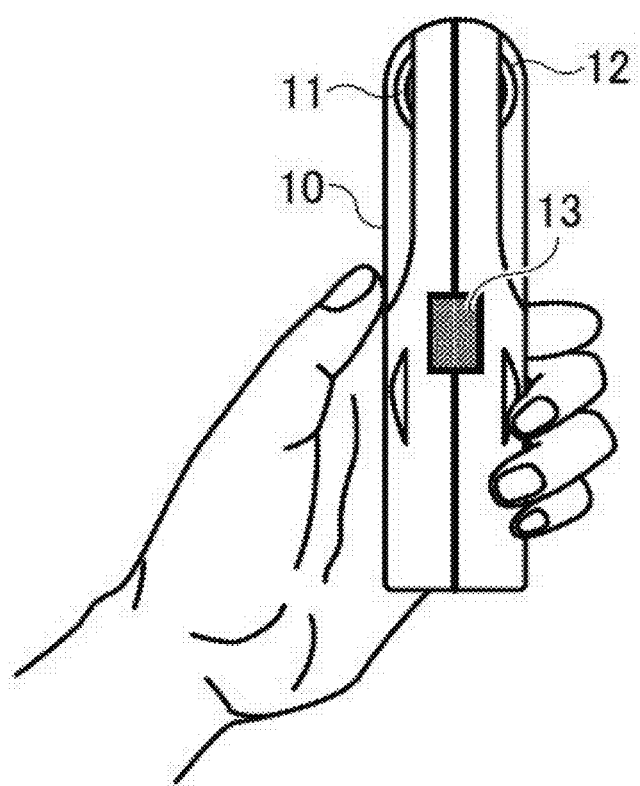
FIG. 1A illustrates an exemplary imaging apparatus.
Figure 1B:
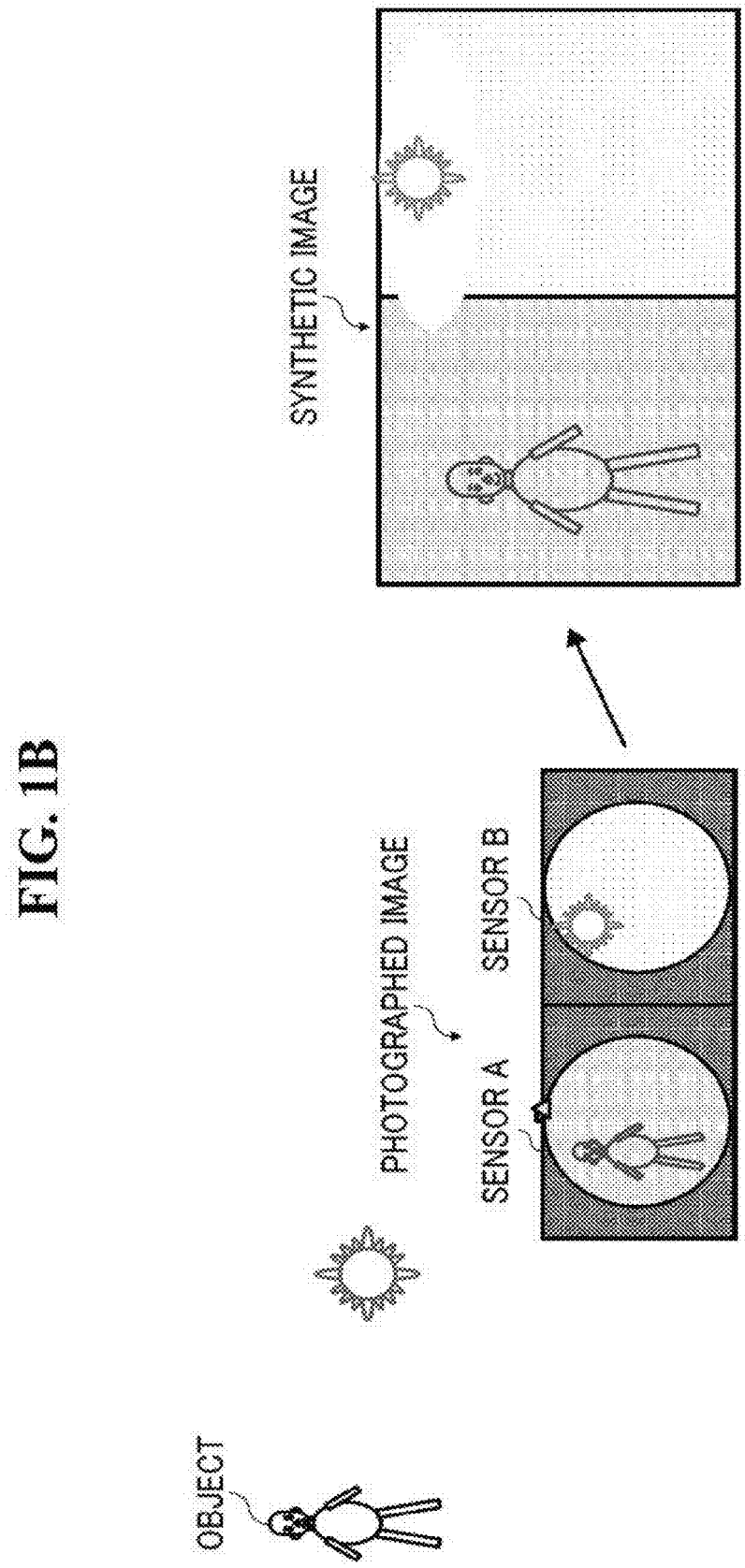
FIG. 1B illustrates exemplary images captured by the imaging apparatus.

FIG. 1A illustrates an exemplary imaging apparatus. FIG. 1B illustrates exemplary images captured by the imaging apparatus.

In some embodiments, imaging apparatus 10 may be a spherical imaging camera that captures spherical images, but imaging apparatus 10 is not limited to this, and imaging apparatus 10 may be a digital camera that captures images and video. Further, imaging apparatus 10 may be incorporated in, or be a component of, a cellar phone, a smart phone, a note PC, a tablet PC, a PDA (Personal Digital Assistant) and/or other device.

In an exemplary implementation, imaging apparatus 10 includes fisheye lenses 11 and 12, which each have a wide angle of view over 180-degrees so as to capture an omnidirectional field of view at a capturing position. Each fisheye lens 11 and 12 includes an imaging element, which will be discussed later. In some embodiments, imaging apparatus 10 may include more than two fisheye lenses and imaging elements.

Wide-angle lenses such as fisheye lenses 11 and 12 make it possible to adopt a method of equidistance projection, in which a distance from a center of a capturing image and an incident angle of lights are commensurable.

Imaging elements of imaging apparatus 10 may include a charge coupled device (CCD) imaging sensor, which converts incident light into an electrical signal, or a CMOS imaging sensor, for example. Each imaging element captures an omnidirectional image of light passed through the wide-angle fisheye lens and, due to the greater the 180-degrees of the fisheye lens, there is an overlapping image region in the captured image.

Imaging apparatus 10 may include button 13. When a user of imaging apparatus 10 pushes button 13, imaging apparatus 10 captures an image by exposes the imaging elements at a same time. The two imaging elements acquire images by converting received light into an electrical signal. Each acquired image has a wide viewing angle and may be referred to as a fish eye image because the image is acquired using fisheye lenses 11 and 12. After the two fish eye images are acquired by each of the two imaging elements, image processing is performed, including image conversion and stitching of the overlapping regions, to generate a spherical image.

Imaging apparatus 10 can store the generated spherical image and data of the spherical image as receiving request by a user of imaging apparatus 10. Imaging apparatus 10 may also output the spherical image to an external apparatus such as a display or a PC. For example, imaging apparatus 10 may control display of the spherical image on the display. Additionally, imaging apparatus 10 may output the spherical image to other types of external devices such as a printer or a multi-function peripheral (MFP). Further, imaging apparatus 10 may output the spherical image via Fax or electronic communication, such as e-mail or data message.

FIG. 1B illustrates two fish eye images as the capturing image captured by the imaging apparatus 10. Each fish eye image illustrates the capturing image by the two imaging elements (cameras A and B), and the fish eye image captured by camera B includes a high luminosity object such as the sun. Due to the high luminosity object, the imaging element of camera B generates a blurred white image, referred to as flare, with a high difference in luminous intensity between the two fish eye images. A synthetic image is generated by stitching the two fish eye images together based on an appropriate object image, which is in a boundary part of each image.

Depending on the image, it is possible for the flare to spread between the imaging elements, and in some cases, an appropriate object image is not located in the boundary part. In such situations, the above synthetic image can be generated by performing an image correction or an image processing method.

Figure 2:
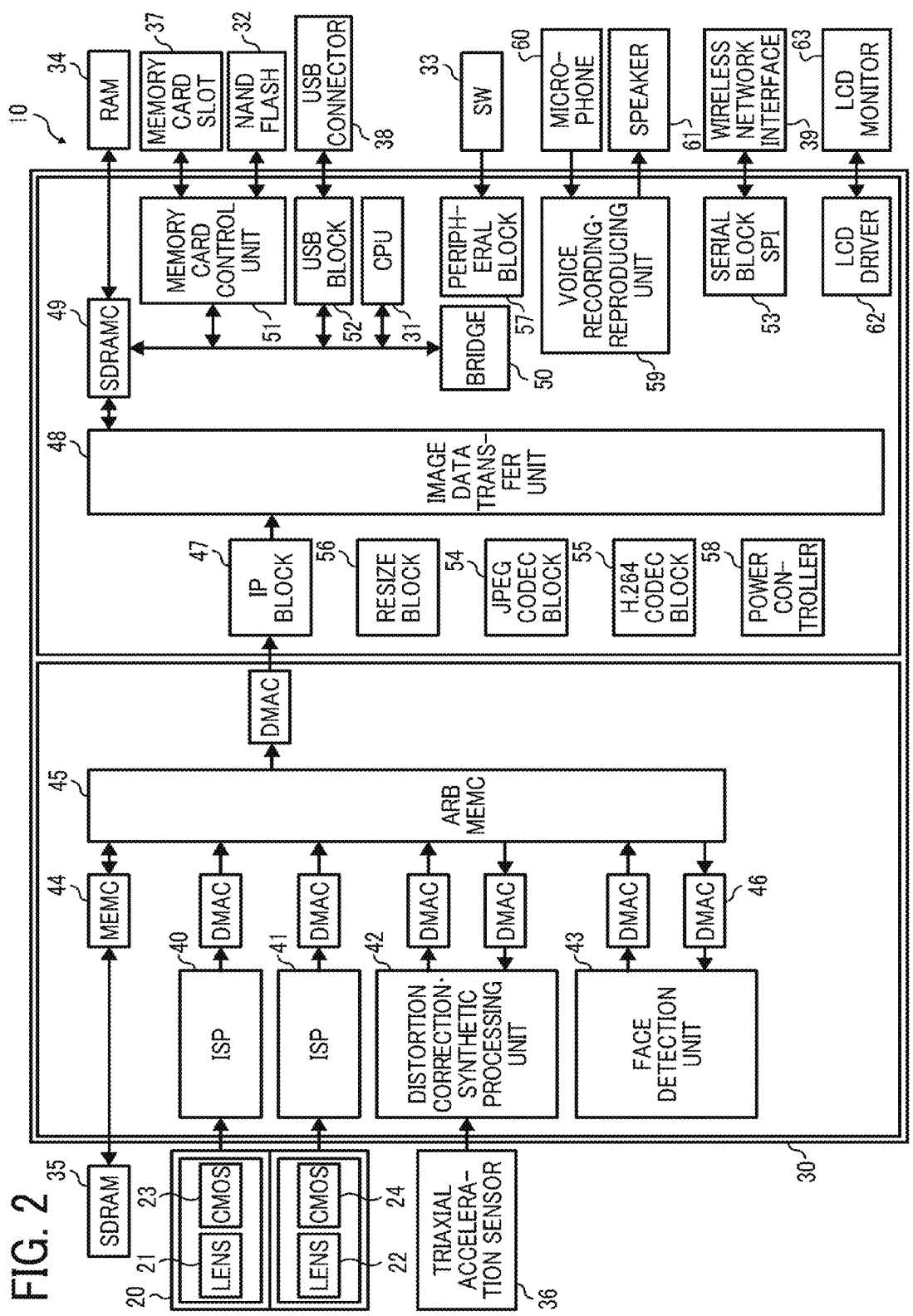
FIG. 2 illustrates a hardware configuration of the imaging apparatus.

FIG. 2 illustrates a hardware configuration of imaging apparatus 10 illustrated in FIG. 1A. In particular, FIG. 2 illustrates imaging apparatus 10, which includes barrel unit 20. Barrel unit 20 includes an optical system including lenses 21 and 22 and imaging elements (CMOS) 23 and 24. Lenses 21 and 22 correspond to fisheye lenses 11 and 12 illustrated in FIG. 1A.

Lenses 21 and 22 converge light from an object to be incident to imaging elements 23 and 24. Imaging elements 23 and 24 convert the incident light into an electrical signal. Imaging elements 23 and 24 are controlled by control order from central processing unit (CPU) 31 in processor 30 equipped in the camera body, which is described later.

Imaging apparatus 10 may include circuitry that encompasses all of processor 30 and storage, such as RAM 34, NAND FLASH 32, SDRAM 35. For example, in some embodiments, the circuitry includes CPU 31, which controls the functions of imaging elements 23 and 24. The circuitry may be processing circuitry.

The functionality of CPU 31 can be derived from read instructions and setting values used for conduct control that may be stored in NAND FLASH 32, which is used as a ROM. Button 13 may be utilized as a power switch to turn on power of the imaging apparatus 10, and if power is turned on, CPU 31 may perform control operations.

When CPU 31 conducts control operations, in addition to controlling a behavior of each unit in imaging apparatus 10, data for the control is temporarily saved in RAM 34 and local SDRAM, such as SDRAM 35. However, data may be stored in a ROM.

The circuitry, such as processor 30, may include Image Signal Processor (ISP) 40 and 41. ISP 40 and 41 conduct white balance processing and gamma correction to an image data which is output from the imaging elements. The white balance processing is a process which applies gain to present a white part as white color in response to, for example, sun light and/or a fluorescent lamp. Gamma correction processing is a correction process to conduct the input signal such as keeping output linearity in consideration of the characteristic of the output apparatus. Also, ISP 40 and 41 convert the luminosity data as luminosity information and color difference data to color difference information by extracting a luminosity value and/or a color difference value by filtering process to the image data.

The imaging apparatus 10 further includes SDRAM 35 and the triaxial acceleration sensor 36. Before conduction by the ISP 40 and 41, and conducting distortion correction which is described later and synthetic processing, SDRAM 35 temporarily saves the image data. The biaxial acceleration sensor 36 measures acceleration of the imaging apparatus 10. Measured acceleration is used to decide an inclination and vertical direction of the camera.

Processor 30 further includes distortion correction-synthetic processing unit 42, which processes the two image data, which is output from imaging elements 23 and 24 and conducted by the ISP 40 and 41, to generate synthesized image data. Distortion correction-synthetic processing unit 42 also conducts distortion correction and vertical correction at a same time by using information from the triaxial acceleration sensor 36, the synthetic image which inclination is corrected is generated. In the distortion correction, for example, by using a conversion table, a fish eye image is converted to a two dimensional plane image.

Processor 30 further includes face detection unit 43, which conducts face detection by using the synthetic image to identify a position of face. The identified position of face is used for focusing (adjusting a focus) when capturing an image.

SDRAM 35 connects to ARB MEMC 45 through MEMC 44, the triaxial acceleration sensor 36 connects directly, distortion correction-synthetic processing unit 42.

MEMC 44 is a controller which reads out the image data from the SDRAM 35 and controls writing of the image data to the SDRAM 35. ARB MEMC 45 is a controller which adjusts an exchange of the image data.

DMAC 46 is established between the ISP 40 and 41, distortion correction-synthetic processing unit 42, face detection unit 43 and ARB MEMC 45, transferred the image data directly not through the CPU 31. ARB MEMC 45 sends the image data to image data transfer unit 48 through DMAC 46 and IP block 47. IP block 47 performs various image processing regarding to the image data.

Image data transfer unit 48 reads out data from RAM 34 and is connected to SDRAMC 49. SDRAMC 49 controls the writing of data to RAM 34. SDRAMC 49 connects bridge 50, memory card control unit 51, USB block 52 and CPU 31.

Memory card control unit 51 connects to memory card slot 37 and the NAND FLASH 32, which connects a memory card which records the image data, reads out data from the memory card and write data. Memory card control unit 51 controls the writing of data to memory card slot 37 and NAND FLASH 32. USB block 52 connects to an external device via USB CONNECTOR 38, to communicate with the external device and USB.

In some embodiments, processor 30 is connected to an embedded memory, which is not illustrated in FIG. 2. Processor 30 may save the image data to a memory card if the memory card is plugged in the memory card slot 37.

Processor 30 further includes serial block SPI 53, JPEG code block 54, H.264 codec block 55 and resize block 56. Serial block SPI 53 conducts serial communication through an external device and wireless network interface 39 performs wireless communication, such as over Wi-Fi.

JPEG code block 54 is codec block for JPEG compression and decompression. H.264 codec block 55 is codec block for H.264 video compression and decompression. Resize block 56 is a block for enlarged or reduced by interpolating an image size of the image data.

Additionally, processor 30 includes peripheral block 57, which turns power on and off to the imaging apparatus 10 after receiving an ON/OFF command from the button 13 and/or power controller 58. Power controller 58 provides power to each unit of imaging apparatus 10. In some embodiments, processor 30 may include voice recording reproducing unit 59, which records voice and reproduces. The voice recording reproducing unit 59 is connected to a microphone 60 which user inputs voice signal into and a speaker 61 which outputs recorded voice signal.

Voice recording reproducing unit 59 includes a microphone AMP which amplifies voice signal input by the microphone 60 and voice recording circuit which records the amplified voice signal. Also, voice recording reproducing unit 59 includes a voice reproducing circuit, which converts a recorded voice signal to a signal which can output from the speaker 61, audio AMP for amplifying converted voice signal and driving the speaker 61. Voice recording reproducing unit 59 may be controlled by CPU 31 and/or processor 30.

Further, the image data saved in the SDRAM and/or the embedded memory, which is not illustrated, is RAW-RGB image data of the state conducted white balance setting and gamma setting by the ISP4 and YUV image data after filtering processing. Also, the image data is compressed by PEG code block 54 is raised.

In some embodiments, processor 30 further includes a drive circuit, which drives a display device, such as LCD monitor 63, via LCD driver 62. LCD driver 62 converts a command from the CPU 31 to a signal for displaying the image data and the present state (status) on LCD monitor 63.

Figure 3:
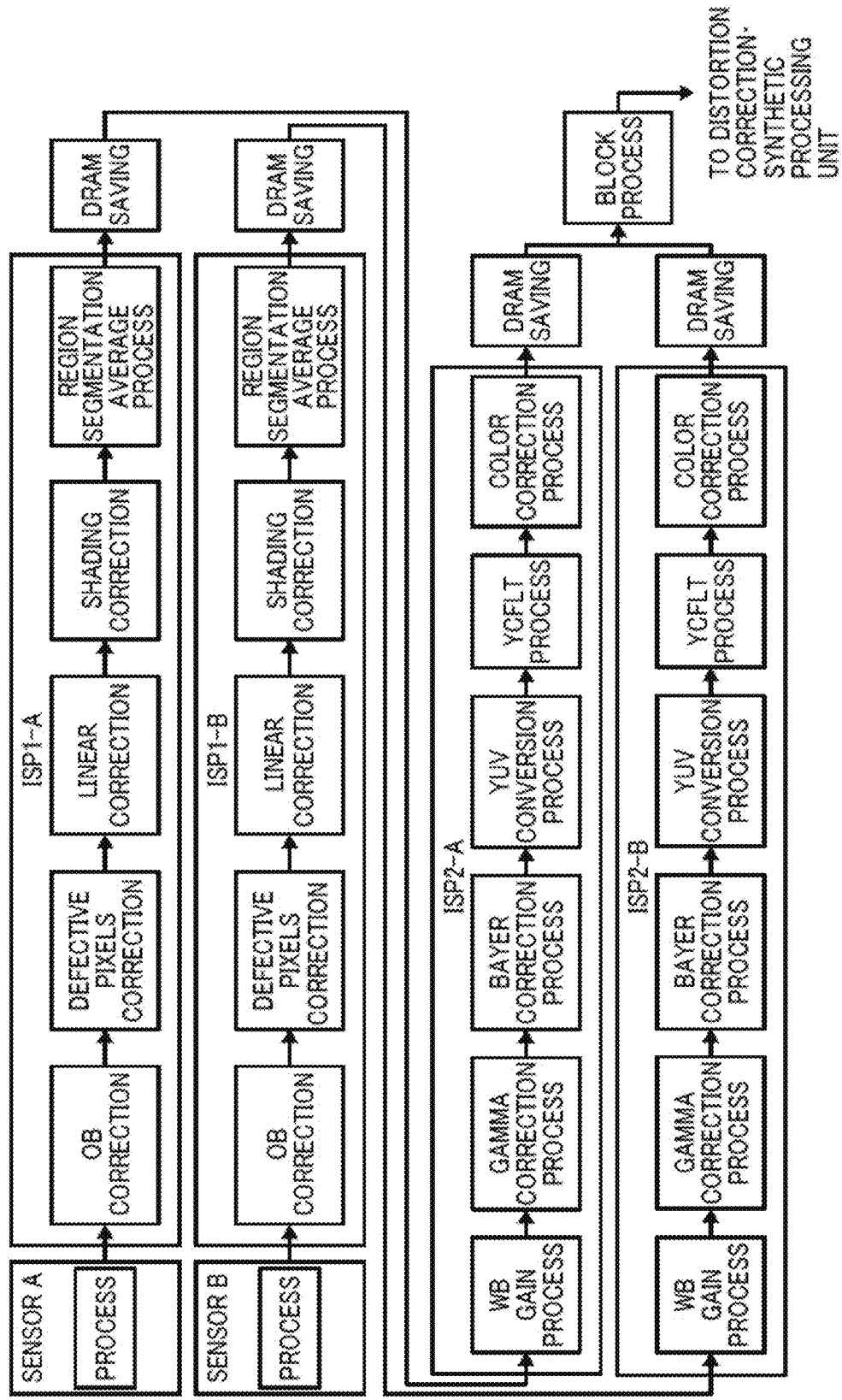
FIG. 3 illustrates a flowchart of processing executed by the imaging apparatus.

FIG. 3 illustrates a flowchart of processing executed by the imaging apparatus 10 illustrated in FIG. 2.

In some embodiments, sensor A corresponds to imaging element 23 and sensor B corresponds to imaging element 24, as illustrated in FIG. 2. ISP 1-A and ISP 2-A correspond to ISP 40 and ISP 1-B and ISP 2-B correspond to ISP 41, as illustrated in FIG. 2. The image data output from sensor A is input into ISP 1-A. The image data output from the sensor B is input into ISP 1-B, ISP 1-A and ISP 1-B conduct optical black (OB) correction, defective pixel correction, linear correction, shading correction and region segmentation average processing.

When performing an OB correction processing, IPS 1-A and IPS 1-B each acquire an output signal of an optical black region as a black criteria level, and correct the output signal of an effective pixel region of the image data.

Each of sensor A and sensor B include a plurality of pixels that are formed by photosensitive elements of many photodiodes upon a semiconductor base. Frequently, a defective pixel is produced, in which the pixel value is erroneous, due to impurities in the semiconductor base. To correct for such defective pixels, defective pixel correction processing is performed. To perform defective pixel correction, ISP 1-A and ISP 2-A adjust the pixel value of the defective pixel based on a synthetic signal generated according to pixels in close vicinity to the defective pixel.

In the linear correction processing, ISP 1-A and ISP 2-A linearly convert the image data corrected in the defective pixel correction processing. This linear conversion is conducted every RGB.

On the surface of each of sensors A and B, luminosity unevenness may occur due to characteristics of the optical system and the imaging system. To perform shading correction processing, ISP 1-A and ISP 2-A correct for distortion by multiplying a predetermined correction coefficient with an output signal of a valid pixel region. Such processing steadies the luminosity. In the shading correction processing, sensitivity correction may also be performed by ISP 1-A and ISP 2-A by compensating according to a correction coefficient for each different color of RGB.

Figures 6, 7:
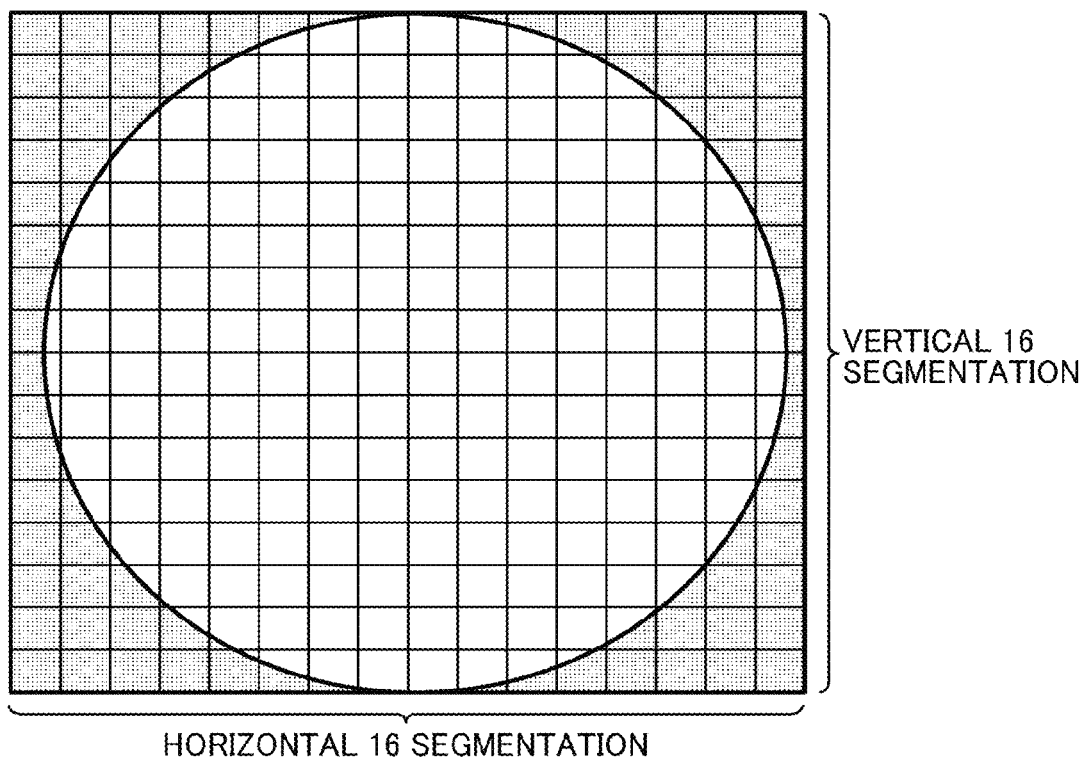
FIG. 6 illustrates an exemplary image divided into a plurality of blocks.
FIG. 7 illustrates an exemplary AE table.

In the region segmentation average processing, ISP 1-A and ISP 2-A divide the valid pixel region into a plurality of blocks, each block being of a predetermined size. Such plurality of blocks is illustrated in FIG. 6. These blocks may be used to calculate an average luminosity in the AE processing, to be described later.

After the region segmentation average processing, ISP 1-A and ISP 2-A save the image data in SDRAM, such as SDRAM 35.

In some embodiments, each of sensors A and B may independently perform a simple AE processing function, and each of sensors A and B may be independently set to correct exposure. For example, when there occurs a change in an exposure condition, each of sensors A and B may use an area integrated value (to be described later) acquired in the region segmentation average processing, and each of sensors A and B is set to correct the exposure by matching the luminous intensity of image boundary parts of each eye image.

After ending the processes performed by ISP 1-A and ISP 1-B, and the saving of the image data in SDRAM, processing is continued by ISP 2-A and ISP 2-B. In particular, ISP 2-A and ISP 2-B perform a white balance (WB) Gain process, a gamma correction processing, a Bayer interpolation process, a Y UV conversion process, a YCFLT process and a color correction process, after which the resulting image is saved in SDRAM.

Typically, a color filter of red (R), green (G) and blue (B) is pasted on a CMOS photodiode, which captures light reflected from objects. Because only light of specific wavelengths passes through the color filter, a charge amount generated by photodiode may vary. For example, G may be of the highest sensitively, with R and B being about half of G.

In the WB gain processing, ISP 2-A and ISP 2-B alter the color of the objects in a captured image according to the source (e.g. sun light, fluorescent lamp, etc.). Captured white light is processed by multiplying gain to R and B.

Typically, a type of output device that displays the image may vary the luminous intensity of an image. In such situations, the relationship between an input signal and the output apparatus follows a non-linear curvature. When there is a non-linear curvature, the image may be perceived by a viewer as dark and objects may not be recognizable. As such, in the gamma correction processing, ISP 2-A and ISP 2-B adjust a characteristic of the input signal according to the output apparatus so as to maintain a linearity of the image signal.

CMOS sensors are arranged in what is called a Bayer arrangement, in which single color filters correspond to each pixel. The CMOS sensor outputs RAW data in which each pixel produces single color information. For color image data, however, three colors, RGB, is necessary. Accordingly, ISP 2-A and ISP 2-B perform a Bayer correction processing to correct pixel information of a pixel according to pixel information of surrounding pixels.

In the YUV conversion processing, ISP 2-A and ISP 2-B convert the RAW image data from RGB data format to YUV format.

The YCFLT processing is an edge enhancement process. In the YCFLT processing, ISP 2-A and ISP 2-B extract edge parts from a luminosity signal of the image, multiply again to the extracted edge, and remove noise of the image by applying a low pass filter (LPF). ISP 2-A and ISP 2-B may also adjust a gain of the image data after applying the LPF.

In the color correction processing, ISP 2-A and ISP 2-B performs processing on the image data to adjust saturation, hue, partial hue change, color suppression and color procession setting. The saturation setting is a process to set parameters such as depth of color of a UV color space.

Before saving the image data in SDRAM, ISP 2-A and ISP 2-B may perform a crop process. The crop process cuts out and isolates a central region of the image to, for example, generate a thumbnail image. The cut out image may also be referred to as a regular image.

The regular image is then transferred to the distortion correction-synthetic processing unit 42, as illustrated in FIG. 2. The distortion correction-synthetic processing unit 42 performs vertical correction processing, such as inclination correction, based on information from the triaxial acceleration sensor 36. Then, JPEG compression is conducted, e.g. at a 0.16 compression coefficient, by JPEG code block 54. The compressed JPEG data is then saved in SDRAM, such as SDRAM 35.

The compressed JPEG data may also be saved in a memory card connected to memory card slot 37 via memory card control unit 51. Further, when transferring data to a communication terminal of an external device, such as a smart phone, the data may be wirelessly transferred using wireless LAN, Wi-Fi, Bluetooth or any other communication protocol. Infrared communication may be performed via serial block SPI 53 and wireless network interface 39.

Specific hardware components of the circuitry of imaging apparatus 10 and the processes conducted by the circuitry and each of the hardware components has been described. Imaging apparatus 10 controls a control shutter speed as described above so as to accurately conduct exposure control. Accordingly, imaging apparatus 10 includes a control system as illustrated in FIG. 4 to solve this.

Figure 4:
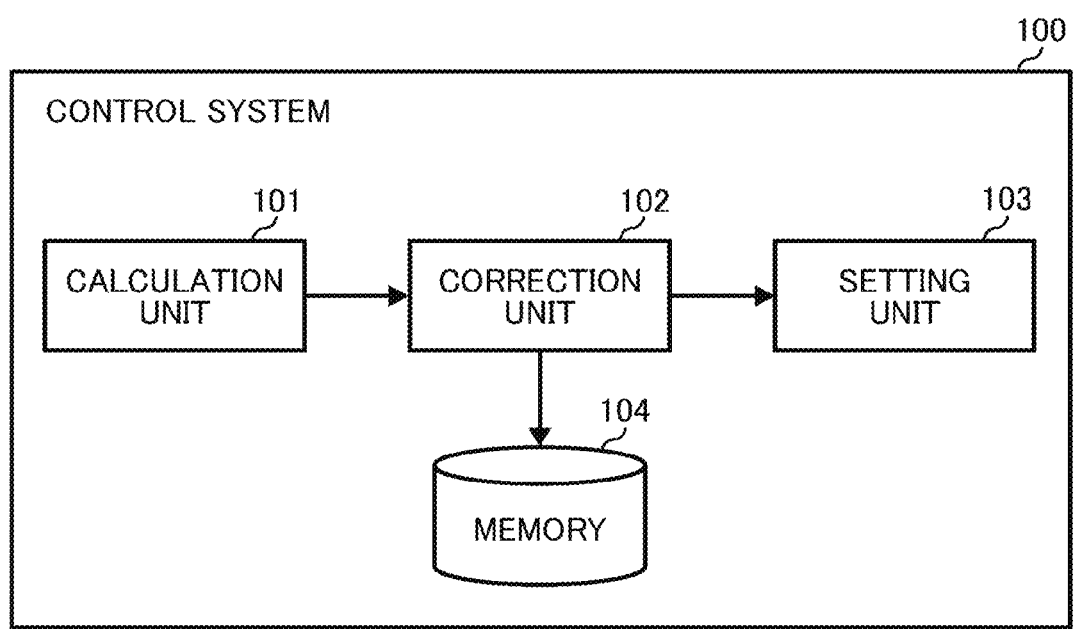
FIG. 4 illustrates a configuration of an exemplary control system of the imaging apparatus.

In particular, FIG. 4 illustrates a configuration of an exemplary control system of the imaging apparatus. In exemplary implementations, the circuitry of imaging apparatus 10 corresponds to the control system 100 of FIG. 4. That is, the circuitry that encompasses processor 30 and CPU 31 executes the functions and processes of control system 100 so as to control imaging apparatus 10. In other embodiments, however, an external device separate from imaging apparatus 10 may perform the functions and processes of control system 100, for example, by performing the functions and processes of control system 100 and controlling imaging apparatus 10 via a network.

Control system 100 includes calculation unit 101, correction unit 102, setting unit 103 and memory 104. As previously described, imaging apparatus 10 includes imaging elements, each of the imaging elements capture light, and the captured tight is converted to an electrical signal so as to acquire an image. Additionally, imaging apparatus 10 acquires images at a certain frame rate when monitoring before the actual capturing of each image.

Calculation unit 101 acquires a setting value to control the imaging elements. The setting value is used to correct an exposure time and a sensitivity value of each of the imaging elements.

Based on the sent value, calculation unit 101 calculates a photometric value, which represents luminous intensity of the object. The photometric value is an object luminosity value. In an exemplary implementation, calculation unit 101 includes a photometric value calculation unit to calculate the photometric value.

Calculation unit 101 also calculates an exposure value. The exposure value represents a degree to which an imaging element is exposure to light. The exposure value may be based on the calculated photometric value. In an exemplary implementation, calculation unit 101 includes an exposure value calculation unit to calculate the exposure value.

The exposure value is associated with a shutter speed and art ISO sensitivity. The shutter speed represents an exposure time in which the imaging elements are exposed to light. ISO sensitivity is a sensitivity value which represents sensitivity of the imaging elements to the light. By using a program chart, a shutter speed and an ISO sensitivity may be calculated from an exposure value and the shutter speed and the ISO sensitivity may be used to correct an exposure according to the calculated exposure value. In an exemplary implementation, calculation unit 101 includes a se g value calculation unit to calculate the setting value based on the exposure value.

In some embodiments, imaging apparatus 10 does include a diaphragm to adjust a luminous intensity when capturing an image with the imaging elements through lenses. To compensate, calculation unit 101 calculates and adjusts the shutter speed and ISO sensitivity. In other embodiments, when imaging apparatus 10 does include a diaphragm, calculation unit 101 may further calculate and compensate with a diaphragm value (F value) that represents a degree to adjust the luminous intensity.

When the diaphragm value is large, light that passes through the lenses decreases. When the shutter speed is fast, the exposure time is short. For this reason, a moving object may be captured without burring effects. If ISO sensitivity is raised, an electrical signal is amplified by the imaging element and the image is made bright. For example, when the diaphragm value is constant and ISO sensitivity is doubled, image brightness is increased when the shutter speed is doubled and the exposure time is decreased.

Memory 104 saves correction information that is used to correct a shutter speed and an ISO sensitivity corresponding to the shutter speed. The correction information will be described later in detail.

Correction unit 102 determines whether the shutter speed calculated by calculation unit 101 needs to be corrected by applying the correction information stored in memory 104. If correction unit 102 determines that correction is necessary, correction unit 102 adjusts the shutter speed and corresponding ISO sensitivity calculated by calculated unit 101 based on the correction information stored in memory 104.

Setting unit 103 sets the shutter speed and the ISO sensitivity, processed by correction unit 101, as the setting value for imaging apparatus 10. Setting unit 103 then conducts an exposure control of the imaging elements. The shutter speed and ISO sensitivity are set according to the setting value and captured images are correspondingly processed.

As described above, by correcting the shutter speed and the ISO sensitivity, by setting the setting value to the imaging elements, accurate exposure control may be performed in situations when luminosity is high.

The processing of each until of control system 100 will now be described in detail with reference to the flowchart illustrated in FIG. 5. In particular, FIG. 5 illustrates a flowchart of an exemplary automatic exposure control adjustment process performed by the imaging apparatus.

Figure 5:
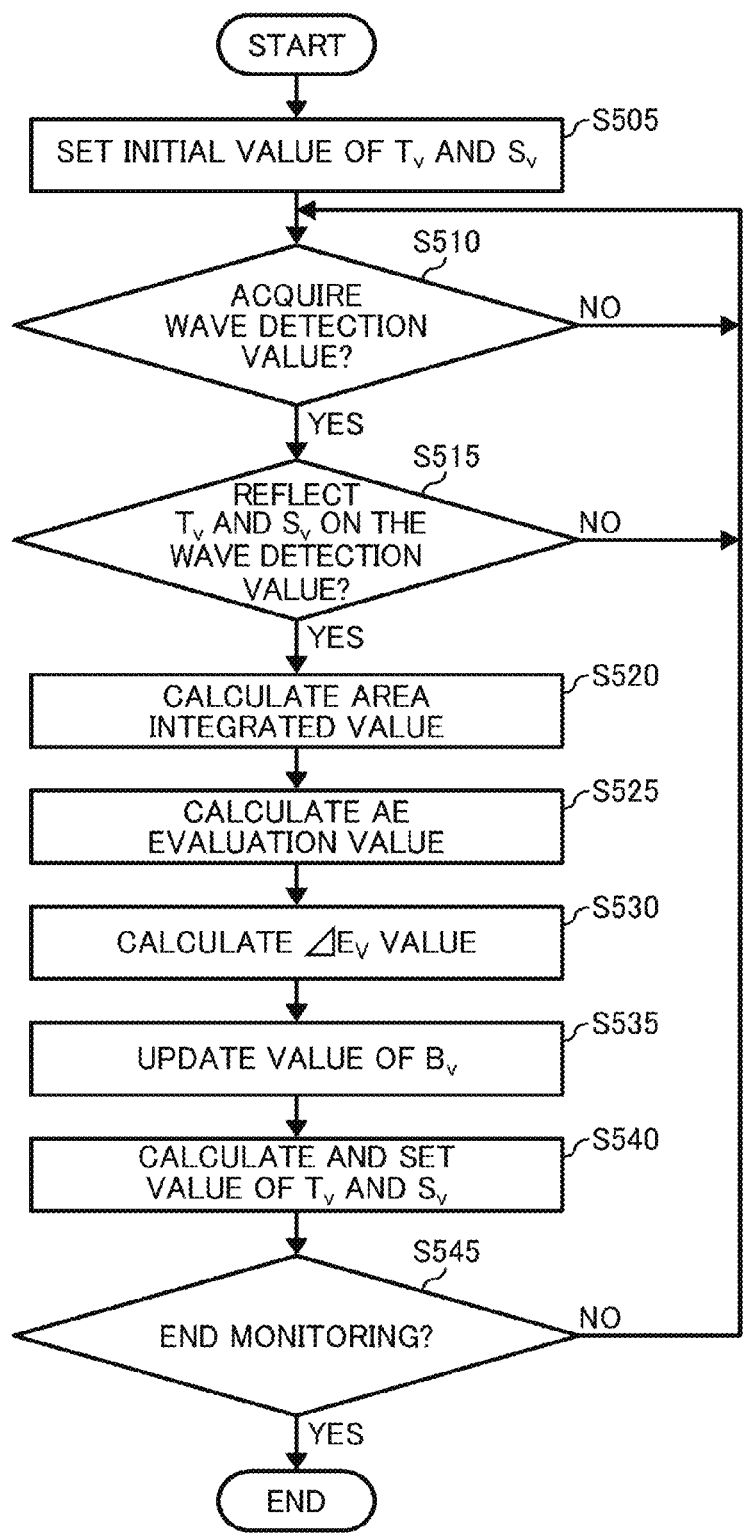
FIG. 5 illustrates a flowchart of an exemplary automatic exposure control adjustment process performed by the imaging apparatus.

The AE processing of FIG. 5 with step 505, in which setting unit 103 sets initial values of shutter speed and ISO sensitivity to sensors A and B. The initial values may be common, i.e. set to both sensor A and B. For example, by using an AE processing function, these values may be set to correct an exposure. Further, the value may be of an Apex format.

Calculation unit 101 calculates object luminosity value $B_v$, and exposure value $E_v$, which is a photometric value. These calculations use shutter speed $T_v$ and ISO sensitivity $S_v$, which are calculated according to formula 1 (below). In formula 1, $A_v$ is a diaphragm value, for example. When imaging apparatus 10 does not include a diaphragm, the value of $A_v$ is a predetermined fixed value. When ISO 100, the start value of $S_v$ is 0×50, Incidentally, $B_v$, and $E_v$, $A_v$ and 0×50 are values in an Apex format.

$$B_v = E_v = T_v + A_v - (S_v - 0 \times 50) \qquad \text{[formula 1]}$$

At step 510, control system 100 acquires a wave detection value. The wave detection value corresponds to RAW-RGB data of the image being acquired by an imaging element. Control system 100 repeats step 510 until the wave detection value is acquired. Further, during each frame, control system 100 repeats step 510. When the wave detection value is acquired, the process proceeds to step 515.

At step 515, control system 100 determines whether $T_v$, and $S_v$, reflect the wave detection value. That is, control system 100 determines whether the image represented by the wave detection value was captured with shutter speed $T_v$ and ISO sensitivity $S_v$. When control system 100 determines that $T_v$ and $S_v$ do not reflect the wave detection value, i.e. the image represented by the wave detection value was not captured with $T_v$ and $S_v$, control system 100 progresses 3 frames forward, returns to step 510 and repeats until $T_v$ and $S_v$ do reflect the wave detection value.

When control system 100 determines that $T_v$ and $S_v$ do reflect the wave detection value, i.e. the image represented by the wave detection value was captured with $T_v$ and $S_v$, control system 100 proceeds to step 520.

At step 520, calculation unit 101 calculates an area integrated value for each of sensor A and sensor B from the wave detection value. The area integrated value is calculated according to formula 2 (below).

$$Y = R \times 0.299 + G \times 0.587 + B \times 0.114 \qquad \text{[formula 2]}$$

In particular, equal segmentation is conducted by blocks in a region spanning Horizontal 16*Vertical 16 from RAW-RGB data of the fish eye images captured by the imaging elements. Exemplary blocks are illustrated in FIG. 6. For this reason, calculation unit 101 may include a region segmentation unit, which segments the RAW-RGB data into many regions.

Further, the RAW-RGB data includes RGB values as pixel values of pixels included in the image. Next, the RGB values are integrated to each segmented block. A luminosity value (Y value) is calculated for block unit according to formula 2 from the RGB value, for which the Y value is assumed as an area integrated value. Further, using a part of the fish eye images as an area integrated value, it is assumed that a circle inner side part is not shaded (see FIG. 1B). In formula 2, R is an R value at RGB, G is a G value at RGB, and B is a B value at RGB.

Here, a segment number of blocks is 16*16=256, but imaging apparatus 10 is not limited thereto. The calculation processing of calculation unit 101 decreases as the segment number decreases, though it is better that calculation time is short, if segment number is too little, because calculation precision decreases, when a natural number segments into n*n is over 4. Also such as n*n, though it is not the thing which necessarily needs that it is equal segmentation, it is better that all segmented blocks segments into equal area and same shape.

Calculation of an area integrated value is conducted by using the captured image is equal segmented into blocks as described above. For example, in case that the captured image has about ten million pixels, each block has about 1000/256=about 3.9 million pixels. Each pixel has information of R, G, and B components associated with object parts, for example, information of 12 bits (from 0 to 255) is recorded and used. According to this example, each block may include information of about 3.9 million R, G, and B components. The area integrated value is calculated by integrating each block having information of about 3.9 million R, G, and B components about each R, G, and B component.

In embodiments including CMOS image sensors, there is a ratio of each pixel of R, G, and B is R:G:B=1:2:1, R pixels of each block become about 0.975 million pixels, G pixels become about 1.95 million pixels, B pixels become about 0.975 million pixels.

Referring back to FIG. 5, at step 525, calculation unit 101 calculates an AE evaluation value by reducing the integrated value by a number of the integrated RGB value (integration number). This AE evaluation value is used to evaluate exposure of the imaging elements in an exposure operation, to be described later. For this reason, calculation unit 101 may include an evaluation value calculation unit for calculating the AE evaluation value.

At step 530, AE evaluation value of each of sensor A and sensor B are averaged together, and the difference ($\Delta E_v$) between the exposure of sensors A and B and a correct exposure is calculated based on the average AE evaluation value an AE table, The 'under constant value' is because it prevents from using the AE evaluation value with the error when calculating average.

An AE Table is a table which represents differences ($\Delta E_v$) between correct exposures and their corresponding AE evaluation values. An exemplary AE table is illustrated in FIG. 7. For example, in a case that the averaged AE evaluation value above is 920, $\Delta E_v$ is calculated as +1 from AE. This +1 illustrates an adjustment of $1E_v$ brightness from a correct exposure. Further, in a case that the averaged AE evaluation value is between two values illustrated by AE table, $\Delta E_v$ is calculated by linear correction between the two values in the AE table.

When the AE evaluation value is less 58 or over 3680, $\Delta E_v$ is set at −3, a minimum value, or +3, a maximum value, in the AE Table. Therefore, even when the AE evaluation value is 50, the $\Delta E_v$ is −3, and even when the AE evaluation value is 3681, the $\Delta E_v$ is +3.

At step 535, the $B_v$ is adjusted by adding the $\Delta E_v$ to the $B_v$ previously calculated by calculation unit 101. In some embodiments, calculation unit 101 may include a photometric value adjustment unit to adjust $B_v$ in step 535.

Calculation unit 101 then calculates the exposure value based on this updated $B_v$, according to formula 1 described above. For example, when $\Delta E_v$ is 0, thus deciding that the exposure is correct and needs no adjustment. However, when $\Delta E_v$ is not equal to 0, the shutter speed $T_v$ and the ISO sensitivity $S_v$ are adjusted in step 540.

Figure 8:
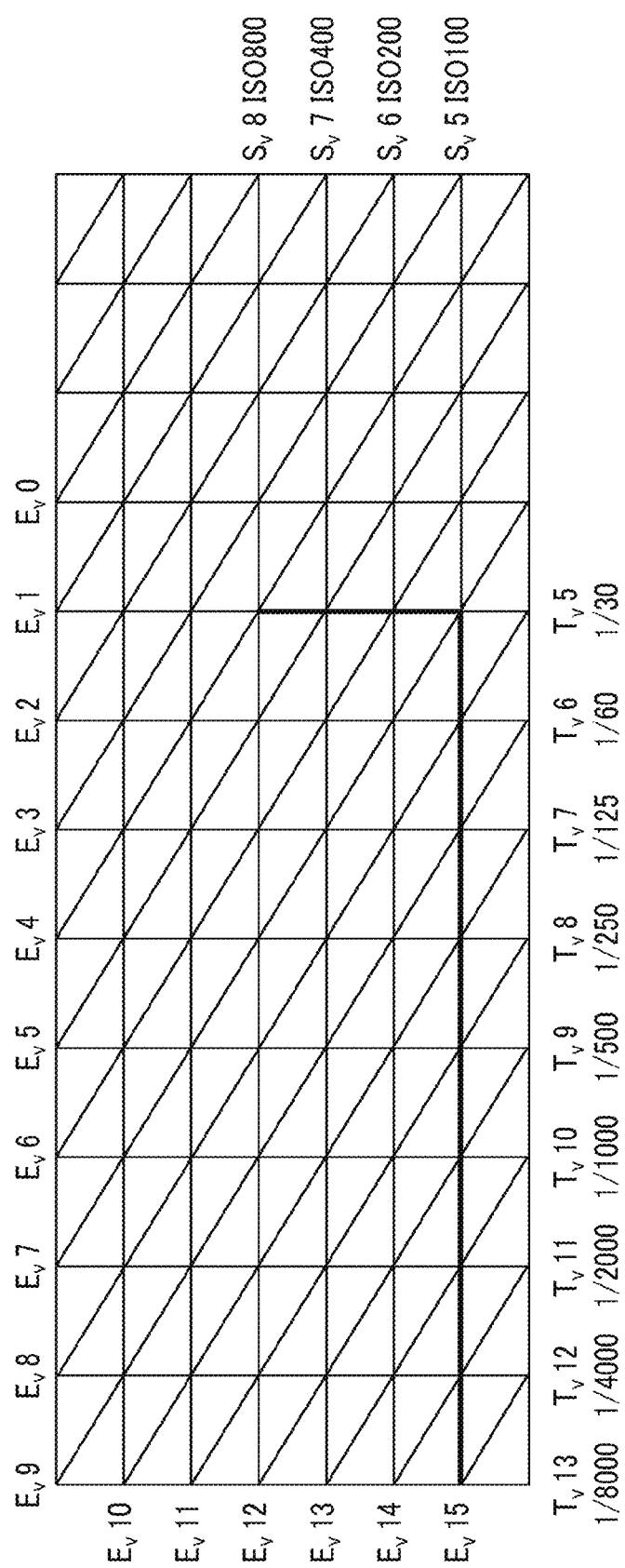
FIG. 8 illustrates an exemplary program chart.

At step 540, by using the calculated $E_v$, according to the program chart illustrated in FIG. 8, correction unit 102 corrects the shutter speed $T_v$ and the ISO sensitivity $S_v$. After correction unit 102 corrects the shutter speed $T_v$ and the ISO sensitivity $S_v$, setting unit 103 sets the corrected $T_v$ and $S_v$ to both sensor A and B.

At step 545, control system 100 decides whether the process (monitoring) ends. Monitoring may end by turning off the power of imaging apparatus 10. When control system 100 decides that monitoring is to continue, i.e. not end, the process returns to step 10. On the other hand, when monitoring is to end, proceeding to step 550, and the AE processing is stopped.

When monitoring, calculation and setting of the above $T_v$ and $S_v$ setting value are repeated. and the setting value is adjusted to correct the exposure of the imaging elements.

For example, at step 540, when the calculated $E_v$ is 9, the shutter speed $T_v$ is 7 and the ISO sensitivity $S_v$ is 5, a point at which an offset line crosses a bold line is calculated by $E_v$ 9 in the program chart illustrated in FIG. 8. Incidentally, in FIG. 8, a numerical value which is 9, 7, and 5 illustrated on the side of $E_v$, $T_v$, and $S_v$ is a value presented by the Apex format. Also, the fraction illustrated on the lower side of $T_v$ is an original value of shutter speed which not present by Apex format and value illustrated on the light side of $S_v$ is an original value of ISO sensitivity which not present by Apex format.

Figure 9:
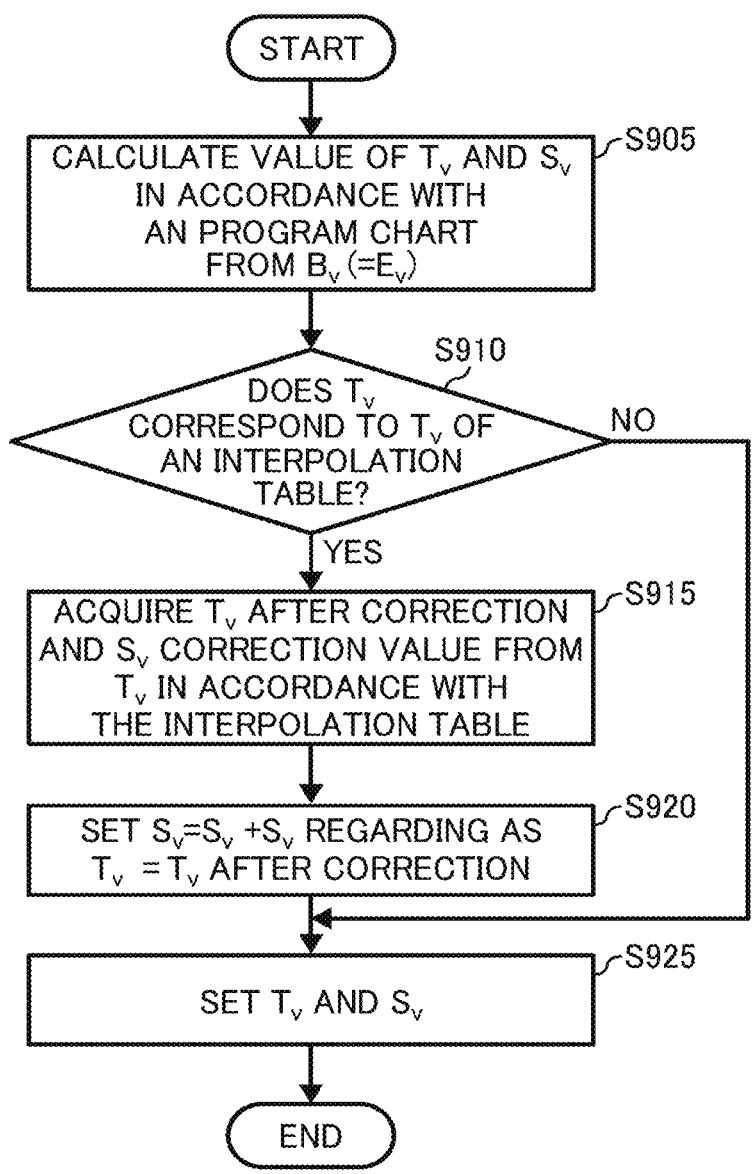
FIG. 9 illustrates a flowchart of an exemplary process to set a shutter speed and an ISO sensitivity performed by the imaging apparatus.

Calculation and setting of the values of $T_v$ and $S_v$ in step 540, as illustrated in FIG. 5, is described in detail by referencing the flowchart illustrated in FIG. 9.

In particular, FIG. 9 illustrates a flowchart of an exemplary process to set the shutter speed and the ISO sensitivity performed by imaging apparatus 10.

At step 905, calculation unit 101 calculates $T_v$ and $S_v$ according to $B_v$, which is updated at step 535 of FIG. 5 and in accordance with the program chart illustrated in FIG. 8.

At step 910, correction unit 102 decides whether the calculated $T_v$ corresponds to a $T_v$ value in a correction table, e.g. as illustrated in FIG. 10.

The correction table of FIG. 10 includes an input field and an output field. $T_v$ before correction is set at the input field, and $T_v$ after correction and the corresponding $S_v$ correction value are out at the output field.

When shutter speed needs correction, for example, a predetermined value is set to $T_v$ before correction. In FIG. 10, assuming that the camera has 1/16 resolution, the predetermined value in case of 0*10, 0*20, 0*30, . . . , 0*C0, . . . as shutter speed of ½, ¼, ⅛, ¼000, . . . is set. Incidentally, 0xBF of input field corresponds to ⅓900.

For example, when the calculated $T_v$ is 0*BF, if according to this correction table, 0*C0 is corrected from $T_v$, and a correction is calculated $S_v$ on +1 is performed. The '+1' means that if the calculated $S_v$ is ISO 100, $S_v$ is converted to ISO 104, which is sensitivity on 1/16, and if ISO 200, $S_v$ is converted to ISO 208. In the case of +2, if the calculated $S_v$ is ISO 100, $S_v$ is converted to ISO 109, which is sensitivity on 2/16.

In the above example, when the calculated $T_v$ is 0*BF, 0*C0 is changed. Because shutter speed increases, the luminous intensity of an object becomes dark. There, by adjusting $S_v$ to be +1, raising ISO sensitivity and luminous intensity of object becoming lighter, the luminous intensity is adjusted.

The value of $T_v$, calculated at step 905, is acquired as value of 0*B1, 0*B9 and so on, and such value is not necessarily the value which can be set shutter speed because the camera has 1/16 resolution. For example, sometimes referred to settable between 1/2900 seconds (0*B7) and 1/4000 seconds (0*C0) as shutter speed. The between value cannot be set, therefore cannot be used. Shutter speed not used like this is set into the correction table, so that when correction is performed, detailed exposure control can be realized. Although correction with the correction table of FIG. 10 has been described, correction is not limited to the correction table of FIG. 10, and $T_v$ after correction may be calculated by another conversion equation representing a relation between $T_v$ before correction and $T_v$ after correction.

When deciding that $T_v$ corresponds to $T_v$ in the correction table, the process proceeds to step 915. In step 915, $T_v$, $S_v$ after correction values are acquired in accordance with the correction table.

At step 920, control system 100 uses the acquired $T_v$, $S_v$ correction values to calculate corrected $T_v$, $S_v$ values.

At step 925, control system 100 sets $T_v$ and $S_v$ as the setting value for sensors A and B. In particular, control system uses the corrected $T_v$, $S_v$ values to set $T_v$ and $S_v$ when correction is performed in step 902. When correction unit 102 decides, in step 910, that the calculated $T_v$ does not correspond to a $T_v$ value in a correction table, control system 100 sets $T_v$ and $S_v$ as the calculated $T_v$ and $S_v$ from step 905.

After $T_v$ and $S_v$ are set, imaging apparatus 10 captures an image. When an object is imaged, a gamma value may be adjusted according to the gamma correction or gain value processing, as previously discussed in accordance with FIG. 3.

Embodiments in accordance with the present disclosure may utilize circuitry, dedicated hardware or a mixture of dedicated hardware and and/or circuitry executing software. For example, the present disclosure may be implemented as one or more networked processing apparatuses including circuitry that executes software in accordance with the present disclosure. Processing apparatuses in accordance with the present disclosure may comprise any suitably programmed apparatuses such as a general purpose computer, personal digital assistant, mobile telephone (such as a WAP or 3G-compliant phone), server, accessory device or other digital device including circuitry.

Aspects of the present disclosure may encompass computer software that is executed by circuitry, processing circuitry, or another programmable device. The computer software may be provided to the programmable device using any storage medium for storing processor readable code such as a floppy disk, hard disk, CD-ROM, magnetic tape device, solid state or other memory device.

Features in accordance with the present disclosure may be stored in a non-transitory computer readable medium. For example, a non-transitory computer readable medium may store computer executable instructions that, when executed by circuitry of an imaging apparatus, cause the circuitry to perform image processing in accordance with the present disclosure. That is, the computer executable instructions may cause an imaging to perform the processing discussed above with respect to FIGS. 3, 5 and 9.

Moreover, variations and modifications may be made without departing from the scope of the present disclosure.

What is claimed is:

1. An imaging apparatus, comprising:
   a plurality of imaging elements that each form an image by capturing light passed through lenses;
   a calculation circuit that calculates, for each imaging element, an exposure time and a sensitivity value, the sensitivity value being a sensitivity of the imaging element to the light, the exposure time being a time in which the imaging element is exposed to the light and the calculation circuit calculates the exposure time based on the image acquired by the imaging element and an exposure area of the imaging element in which the light has passed through the lenses;
   a memory that stores correction information used to correct each of the exposure times and each of the sensitivity values, the correction information including a predetermined exposure time and a predetermined sensitivity value corresponding to the predetermined exposure time;
   a correction circuit that, for each imaging element, corrects the exposure time and the sensitivity value, when the exposure time corresponds to the predetermined exposure time, according to the correction information to generate a corrected exposure time and a corrected sensitivity value;
   a setting circuit that sets, for each imaging element, a setting value to control the imaging element, wherein for each imaging element,
      the setting circuit sets the setting value as the exposure time and the sensitivity value when the exposure time calculated by the calculation circuit does not correspond to the predetermined exposure time, and
      the setting circuit sets the setting value as the corrected exposure time and the corrected sensitivity value when the exposure time calculated by the calculation circuit corresponds to the predetermined exposure time;
   a control circuit that controls a simultaneous exposure of the plurality of imaging elements according to the setting values; and
   an image generating circuit that generates a second image from the images acquired by the plurality of imaging elements.

2. The imaging apparatus according to claim 1, wherein the correction information includes a program chart associated with the predetermined exposure time, an exposure time after correction and a correction value correcting the sensitivity value,
   the correction circuit, for each imaging element, acquires the exposure time after correction and the correction value corresponding to the predetermined exposure time to correct the exposure time and the sensitivity value, and
   the correction circuit generates the corrected sensitivity value by adding the correction value to the sensitivity value.

3. The imaging apparatus according to claim 1, wherein the calculation circuit comprises:
   a photometric value calculation circuit that, for each imaging element, acquires the setting value set by the setting circuit and calculates, based on the setting value, a photometric value that represents a luminous intensity of imaged objects;
   an exposure value calculation circuit that, for each imaging element, calculates an exposure value, which represents a degree of exposure of the plurality of imaging elements, based on the photometric value; and
   a setting value calculation circuit that, for each imaging element, calculates the exposure time and the sensitivity value according to the exposure value.

4. The imaging apparatus according to claim 3, wherein the calculation circuit further comprises:
a region segmentation circuit that divides images acquired by the plurality of imaging elements into a plurality of regions;
an evaluation value calculation circuit that calculates an evaluation value for evaluating an exposure of each of the imaging elements by using pixel values of pixels in each region of the plurality of regions; and
a photometric value adjustment circuit that adjusts the photometric value based on the evaluation value.

5. The imaging apparatus according to claim 1, wherein the second image generated by the image generating circuit is a spherical image.

6. The imaging apparatus according to claim 5, wherein the plurality of imaging elements contain two imaging elements,
each of the two imaging elements form wide-angle images with an angle-of-view greater than 180 degrees, and
the image generating circuit stitches the wide-angle images together to generate the spherical image.

7. The imaging apparatus according to claim 1, further comprising a plurality of lenses, each lens of the plurality of lenses corresponding to an imaging element of the plurality of imaging elements.

8. The imaging apparatus according to claim 1, further comprising a communication circuit that transmits the second image generated by the image generating circuit.

9. A method for controlling an imaging apparatus including a plurality of imaging elements that each form an image by capturing light passed through lenses, the method comprising:
calculating, by a calculation circuit, for each imaging element, an exposure time and a sensitivity value, the sensitivity value being a sensitivity of the imaging element to the light, the exposure time being a time in which the imaging element is exposed to the light and the calculation circuit calculates the exposure time based on the image acquired by the imaging element and an exposure area of the imaging element in which the light has passed through the lenses;
storing correction information in a memory, the correction information used to correct each of the exposure times and each of the sensitivity values, and the correction information including a predetermined exposure time and a predetermined sensitivity value corresponding to the predetermined exposure time;
correcting, by a correction circuit and for each imaging element, the exposure time and the sensitivity value, when the exposure time corresponds to the predeteimined exposure time, according to the correction information to generate a corrected exposure time and a corrected sensitivity value;
setting, by a setting circuit for each imaging element, a setting value to control the imaging element, wherein for each imaging element, the setting includes:
setting the setting value as the exposure time and the sensitivity value when the exposure time calculated in the calculating does not correspond to the predetermined exposure time, and
setting the setting value as the corrected exposure time and the corrected sensitivity value when the exposure time calculated in the calculating corresponds to the predetermined exposure time;
controlling, by a control circuit, a simultaneous exposure of the plurality of imaging elements according to the setting values; and
generating a second image from the images acquired by the plurality of imaging elements.

10. The method according to claim 9, wherein
the correction information includes a program chart associated with the predetermined exposure time, an exposure time after correction and a correction value correcting the sensitivity value,
the correcting includes acquiring, by the correction circuit for each imaging element, the exposure time after correction and the correction value corresponding to the predetermined exposure time to correct the exposure time and the sensitivity value, and
the correcting includes generating, by correction circuit, the corrected sensitivity value by adding the correction value to the sensitivity value.

11. The method according to claim 9, wherein the calculating, by the calculation circuitry, comprises:
acquiring, for each imaging element, the setting value set by the setting circuit and calculates, based on the setting value, a photometric value that represents a luminous intensity of imaged objects;
calculating, for each imaged element, an exposure value, which represents a degree of exposure of the plurality of imaging elements, based on the photometric value; and
calculating, for each imaging element, the exposure time and the sensitivity value according to the exposure value.

12. The method according to claim 11, wherein the calculating, by calculation circuit, further comprises:
dividing images acquired by the plurality of imaging elements into a plurality of regions;
calculating an evaluation value for evaluating an exposure of each of the imaging elements by using pixel values of pixels in each region of the plurality of regions; and
adjusting the photometric value based on the evaluation value.

13. The method according to claim 9, wherein the second image is a spherical image.

14. The method according to claim 13, wherein
the plurality of imaging elements contain two imaging elements,
each of the two imaging elements form wide-angle images with an angle-of-view greater than 180 degrees, and
the generatingof the second image includes stitching the wide-angle images together to generate the spherical image.

15. A non-transitory computer readable medium storing computer executable instructions that, when executed by an imaging apparatus including a plurality of imaging elements that each form an image by capturing light passed through lenses, cause the imaging apparatus to:
calculate, for each imaging element, an exposure time and a sensitivity value, the sensitivity value being a sensitivity of the imaging element to the light, the exposure time being a time in which the imaging element is exposed to the light and the calculation circuit calculates the exposure time based on the image acquired by the imaging element and an exposure area of the imaging element in which the light has passed through the lenses;
store correction information used to correct each of the exposure times and each of the sensitivity values, the correction information including a predetermined exposure time and a predetermined sensitivity value corresponding to the predetermined exposure time;

correct, for each imaging element, the exposure time and the sensitivity value, when the exposure time corresponds to the predetermined exposure time, according to the correction information to generate a corrected exposure time and a corrected sensitivity value;

set, for each imaging element, a setting value to control the imaging element so that
the setting value is set as the exposure time and the sensitivity value when the calculated exposure time does not correspond to the predetermined exposure time, and
the setting value is set as the corrected exposure time and the corrected sensitivity value when the calculated exposure time corresponds to the predetermined exposure time;

control a simultaneous exposure of the plurality of imaging elements according to the setting values; and generate a second image from the images acquired by the plurality of imaging elements.

16. The non-transitory computer readable medium according to claim 15, wherein
the correction information includes a program chart associated with the predetermined exposure time, an exposure time after correction and a correction value correcting the sensitivity value,
and the imaging apparatus is further caused to:
acquire, for each imaging element, the exposure time after correction and the correction value corresponding to the predetetined exposure time to correct the exposure time and the sensitivity value, and
generate the corrected sensitivity value by adding the correction value to the sensitivity value.

17. The non-transitory computer readable medium according to claim 15, wherein the imaging apparatus is further caused to:
acquire, for each imaging element, the setting value set by the setting circuit and calculates, based on the setting value, a photometric value that represents a luminous intensity of imaged objects;
calculate, for each imaging element, an exposure value, which represents a degree of exposure of the plurality of imaging elements, based on the photometric value; and
calculate, for each imaging element, the exposure time and the sensitivity value according to the exposure value.

18. non-transitory computer readable medium according to claim 17, wherein the imaging apparatus is further caused to:
divide images acquired by the plurality of imaging elements into a plurality of regions;
calculate an evaluation value for evaluating an exposure of each of the imaging elements by using pixel values of pixels in each region of the plurality of regions; and
adjust the photometric value based on the evaluation value.

19. The non-transitory computer readable medium according to claim 15, wherein the second image is a spherical image.

20. The non-transitory computer readable medium according to claim 19, wherein
the plurality of imaging elements contain two imaging elements,
each of the two imaging elements form wide-angle images with an angle-of-view greater than 180 degrees, and
the imaging apparatus is further caused to stitch the wide-angle images together to generate the spherical image.

* * * * *